United States Patent [19]
Sadeh et al.

[11] Patent Number: 5,205,232
[45] Date of Patent: Apr. 27, 1993

[54] APPARATUS FOR ADVANCE EDGE DETECTION AND SEWING

[75] Inventors: Yaacov Sadeh, Nes Ziona; Yaacov Makover, Moshav Beit Elazari; Bar C. Mardix, Ramat Gan, all of Israel

[73] Assignee: Orisol Ltd., Israel

[21] Appl. No.: 573,369

[22] Filed: Aug. 27, 1990

[30] Foreign Application Priority Data

Aug. 30, 1989 [IL] Israel .................................. 91470
Sep. 13, 1989 [IL] Israel .................................. 91624
Sep. 13, 1989 [IL] Israel .................................. 91625

[51] Int. Cl.⁵ ............................................. D05B 21/00
[52] U.S. Cl. ............................. 112/262.3; 112/121.12
[58] Field of Search ...................... 112/121.12, 121.11, 112/457, 103, 102, 2, 262.3, 266.1; 364/470

[56] References Cited

U.S. PATENT DOCUMENTS

| | | | |
|---|---|---|---|
| 4,526,116 | 7/1985 | Mannel | 112/121.12 |
| 4,834,008 | 5/1989 | Sadeh et al. | 112/121.12 |
| 4,932,343 | 6/1990 | Mardix et al. | 112/121.12 |
| 4,991,524 | 2/1991 | Ozaki | 112/121.12 |
| 5,021,965 | 6/1991 | Olbrich | 112/121.12 |

FOREIGN PATENT DOCUMENTS

| | | |
|---|---|---|
| 0116798 | 8/1984 | European Pat. Off. |
| 238195 | 9/1987 | European Pat. Off. |
| 2711660 | 6/1881 | Fed. Rep. of Germany |
| 8002873 | 12/1980 | PCT Int'l Appl. |
| 2087107 | 5/1982 | United Kingdom |
| 2088095 | 6/1982 | United Kingdom |
| 2122448 | 1/1984 | United Kingdom |
| 2131571A | 6/1984 | United Kingdom |
| 2167211 | 5/1986 | United Kingdom |
| 2225652 | 6/1990 | United Kingdom |
| 8702151 | 4/1987 | World Int. Prop. O. |

OTHER PUBLICATIONS

"Industrial Electronics", IEEE Spectrum, Jan. 1985, pp. 68-71.

Primary Examiner—Peter Nerbun
Attorney, Agent, or Firm—Silverman, Cass & Singer, Ltd.

[57] ABSTRACT

Method and apparatus for edge location analysis preliminary to sewing on a separate computerized sewing apparatus including scanning an object to be sewn by moving it under a scanning assembly in accordance with a predetermined sewing path to provide true edge location data, comparing the true edge location data with the expected edge locations to determine any deviations, and sewing the object using the predetermined sewing path as modified by the true edge locations data.

7 Claims, 5 Drawing Sheets

APPARATUS FOR ADVANCE EDGE DETECTION AND SEWING

FIELD OF THE INVENTION

The present invention relates to apparatus and method for edge location enhancement and analysis, in particular for use in computerized sewing apparatus.

BACKGROUND OF THE INVENTION

Computerized sewing devices are known in the art. Two pieces to be sewn together are placed on a work holder and moved by an X-Y table in the necessary directions for the desired sewing path.

Since the sewing path is pre-programmed and carried out by machine, it is possible that the sewn pieces will move from the ideal position for sewing. This can be caused by improper placement on the work holder, by deformation due to environmental conditions or by deformation due to the sewing process itself. To solve this problem, edge detecting means have been added to the sewing apparatus. These include devices according to U.S. Pat. Nos. 4,834,008 and 4,784,071 to the same applicants, which include cameras and illumination means for scanning the instantaneous location of the sewn edge by utilizing its shadow, comparing it with the expected location, and adjusting the sewing path in real time in accordance with the scanning determination.

These methods serve very well to identify the edge of the sewn piece and to provide instantaneous correction of the sewing path when necessary, thereby compensating, accurately for all the causes of edge variation.

However, this ideal solution requires overall precision in the x-y table and other components for exact correction in real time, resulting in relatively costly components being required.

This method of edge detection is sufficient, in most cases. However, certain combinations of materials and textures pose problems in applying this method, requiring, in order to identify the edge in the field of view, that the algorithm be changed to one which is very complicated and slow.

SUMMARY OF THE INVENTION

It is an object of the present invention to provide a method for edge location analysis which does not suffer from the disadvantages of the prior art.

It is a further object of the present invention to provide a method and apparatus of edge enhancement for computerized sewing apparatus which is easy to perform, and reliable in operation for any of a variety of materials.

It is another object of the invention to provide a method for edge location analysis permitting the use of a relatively inexpensive X-Y manipulator and simpler components than that known in the prior art.

There is thus provided in accordance with the present invention a method for edge location analysis including a scanning cycle wherein an object to be scanned is moved under a scanning assembly in accordance with a predetermined path, collecting the data of the scanned edges in a data bank, transferring the data to apparatus for processing the object, and carrying out the processing cycle using the predetermined path as modified by the data from the data bank.

According to a preferred embodiment, the method for edge location analysis includes the steps of mounting an object onto a workholder, mounting the workholder on an X-Y manipulator, moving the X Y manipulator in accordance with a pre-programmed processing path while performing edge location analysis, generating processing path correction data by the analysis, storing the processing path correction data in computer readable data storage means, transferring the workholder to a computerized processing machine, reading the processing path correction data into the computer of the processing machine, causing correction of the pre-programmed processing path in accordance with the correction data, and processing in accordance with the pre-programmed processing path as amended in accordance with the processing path correction data.

There is further provided in accordance with the present invention apparatus for edge location analysis including apparatus for projecting an illuminated pattern onto an object, a scanning camera disposed in a diagonal relationship with the pattern projection source axis and arranged to provide an output signal corresponding to the scanned object, and a microprocessor for analyzing the location of the edge of the object in accordance with the output signal.

According to a preferred embodiment, the apparatus includes a plurality of pattern projection sources and a plurality of scanning cameras, each camera being disposed in diagonal relationship with the axis of one pattern projection source, the microprocessor being adapted selectively to activate the appropriate associated pattern source and camera.

According to one embodiment of the invention, the apparatus is mounted for scanning operation about the sewing head of computerized sewing apparatus.

According to an alternate embodiment, the apparatus is mounted for edge location analysis above a workholder.

There is also provided in accordance with the present invention a method of edge enhancement for a cut object on a computerized processing apparatus including the steps of marking the cut edge of the cut piece with contrasting means.

According to a preferred embodiment, the step of marking includes painting the cut edge with a contrasting color, or with paint visible under ultraviolet light.

There is further provided in accordance with the present invention apparatus for edge enhancement of a cut object on a computerized processing apparatus including means for marking the cut edge of the cut piece with contrasting means.

According to one embodiment, the means for marking include the cutting die itself, the blade edges of the die being coated with marking means for transference to the cut edge during cutting.

According to another embodiment, the means for marking includes brush or roller means impregnated with the contrasting means and arranged to contact the surface of the cut edge of the cut piece.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to preliminary scanning apparatus for use with any apparatus requiring edge location analysis followed by processing along the edge. The invention is particularly, though not exclusively, useful with computerized sewing apparatus, and is described hereinbelow with specific relation to this type of apparatus.

The present invention further provides a number of methods of edge enhancement which are suitable for use both with preliminary scanning apparatus and with real time edge analysis.

According to the invention, the scanning apparatus has incorporated therein edge position sensing means and cooperates with a microprocessor which has the capability to modify, during a later sewing cycle, a pre-programmed sewing path in accordance with the actual position of the piece being sewn. The scanning apparatus comprises a workholder, a microprocessor, means for scanning segments of an object on the workholder and arranged to provide an output signal corresponding thereto to the microprocessor, means for causing relative movement between the workholder and the scanning means during scanning, means for determining the true edge position from the scanning means' output signal, comparator means in the microprocessor to compare the actual edge position with the programmed expected edge position and to determine any deviation, means coupled to the microprocessor for determining any necessary modification of the sewing path during sewing to compensate for any such deviation and means coupled to the microprocessor for recording any such modification data for transfer to a computerized sewing apparatus.

It is a particular feature of the present invention that the edge location analysis is done separately and prior to the sewing process. The data calculated from the edge location analysis is collected in a data file which is later transferred to the sewing system to be used in combination with the pre-programmed sewing program for sewing along the edge.

It is an advantage of the present system of using a separate station to scan and analyze the edges of an assembly of pieces that a lower cost X-Y system and scanner can be used. Since there is no need to mount the vision system around the sewing head and to subject the measurement process to the critical time requirements of the sewing process, as is the case with real time modification of the sewing program, simpler and less costly equipment is quite satisfactory.

Another advantage is the ability to incorporate edge detection into the computerized sewing of the presently available sewing systems. No modifications to these systems are required except for the construction of a data link between the scanning system and the sewing system.

Figure 1:
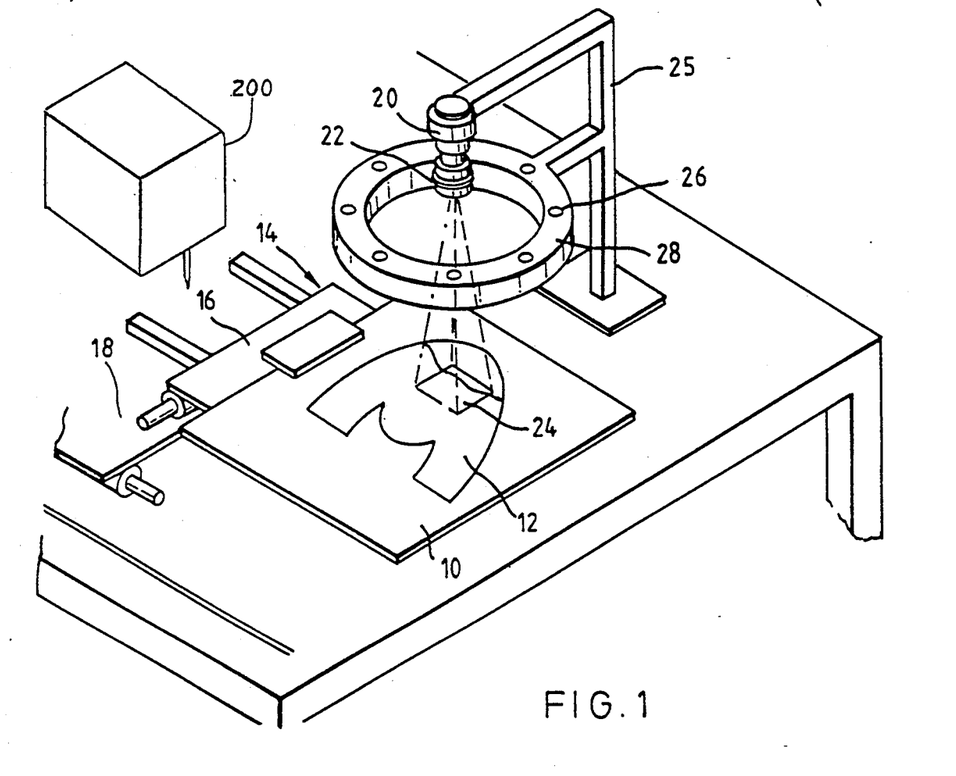
FIG. 1 is a perspective schematic illustration of scanning apparatus constructed and operative in accordance with one embodiment of the present invention.
Figures 2, 3:
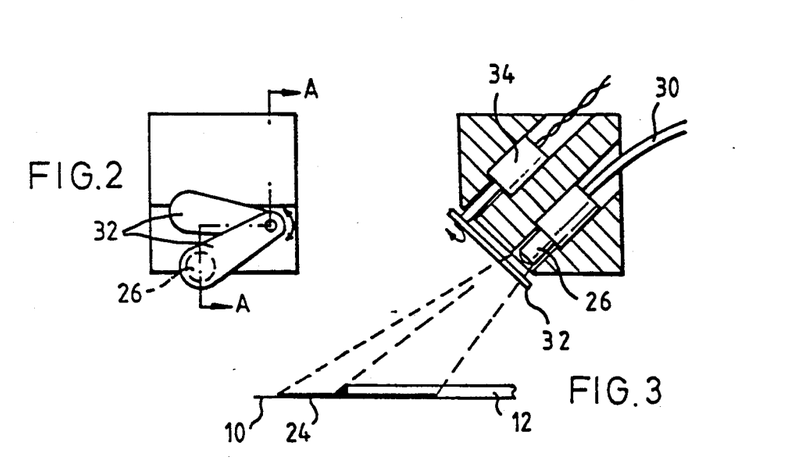
FIG. 2 is a schematic view of one alternate embodiment of illumination means operative in the present invention.
FIG. 3 is a schematic view taken along section A—A of FIG. 2.

Referring to FIGS. 1 and 2 there is shown scanning apparatus constructed and operative in accordance with one embodiment of the present invention. It will be appreciated, however, that many other alternatives embodying this principle may also be utilized.

The scanning apparatus illustrated in FIGS. 1 and 2 comprises a workholder 10 on which is mounted an object to be processed 12. Coupled to workholder 10 is a two-dimensional manipulator 14 comprising two carriages, 16 and 18, for translating the workholder relative to the scanning system in any direction in the horizontal (X-Y) plane. Manipulator 14 may comprise any X-Y table mechanism which is adapted to be driven by computerized commands.

In the illustrated embodiment, the workholder is moved by the X-Y mechanism relative to the scanning system. According to an alternate embodiment, the scanning camera is moved by an X Y mechanism relative to a stationary workholder. It will be appreciated that it is the relative movement which is important for the scanning process.

The scanning system illustrated in FIG. 1 comprises a scanning camera 20 with associated lens 22 mounted on a camera support 25. Camera 20 is disposed vertically above the workholder 10 so that a section of the edge of object 12 is in the field of view 24 of the camera. Illumination of the edge is provided by a plurality of lights 26 mounted concentrically to the camera 20. Lights 26 are activated selectively by a microprocessor (not shown) so as to illuminate the edge diagonally at all times. According to the illustrated embodiment, lights 26 are mounted on a fixed ring 28 attached to the camera support 25.

Lights 26 are selectively activated under computer control so that only a selected light or lights from selected directions is activated for a particular image frame. This serves to enhance the edge segment present in the field of view of the particular frame.

In the embodiment of FIG. 1, lights 26 comprise a plurality of light bulbs which are turned on and off as required. Alternatively, each light 26 may comprise a flash lamp activated by the computer.

According to another embodiment, as shown in FIGS. 2 and 3, lights 26 may comprise a plurality of optical fibers 30 originating from a light source (not shown). Each fiber end is covered by a mechanical shutter 32 which is opened and closed by a rotary solenoid 34, for permitting or preventing the passage of light.

Operation of the scanning apparatus of the present invention is as follows, with reference to FIG. 4, a block diagram illustration of the scanning apparatus of the present invention. An object 12 whose edge is to be analyzed is mounted on workholder 10, as known. A pre-programmed processing program by which object 12 is to be processed is introduced to the microprocessor 40 which is operative to manipulate workholder 10 to move object 12 according to the pre-programmed processing path. For example, in a computerized sewing apparatus, workholder 10 and object 12 are moved precisely as they will be during the sewing process but in the absence of a sewing head and without actual sewing.

As the object moves, microprocessor 40 activates lights 26 as required, and scanning camera 20 scans the portion of the edge within its field of view 24 and sends data corresponding thereto via frame capture means 38 which converts the scanning signal into digital data in the microprocessor's memory. The microprocessor analyzes the scanning data to determine the true edge location in each image frame.

According to one embodiment of the invention, the true edge location data is recorded in a true edge data file on any suitable data storage media, for example on a data diskette 42, for later transfer to the computerized processing apparatus.

According to an alternate embodiment a direct data link 44 from the microprocessor 40 to the processor of the processing apparatus can be utilized for direct downloading of the true edge data.

Once the scanning is complete, the workholder 10, with object 12 still affixed thereto, is moved to the computerized processing apparatus (e.g. a sewing machine 200) and mounted on the X-Y manipulator associated therewith. The true edge data file from the scanning cycle is introduced to the processor of the processing apparatus together with the pre-programmed processing path.

According to one embodiment, comparator means within the processing apparatus' processor is adapted to compare the actual edge position with the programmed expected edge position and to determine any deviation. If there is any deviation, the processor determines the necessary modification of the pre-programmed processing path according to the actual location and deformation of the edges of the object. Processing is now accomplished according to the pre-programmed path as modified in accordance with the modification data.

According to an alternate embodiment, comparator means within microprocessor 40 in the scanning apparatus itself is adapted to compare the actual scanned edge position with the programmed expected edge position and to determine the deviation, as well as the necessary modification of the pre-programmed processing path to compensate therefor. This modification data is recorded, for example on a data diskette, for later transfer to the computerized processing apparatus, which merely reads the modification data and modifies the processing program accordingly.

It will further be appreciated that the scanning apparatus of the present invention can be utilized with any conventional computerized processing or sewing apparatus and with any known scanning system, including that shown in U.S. Pat. Nos. 4,784,071 and 4,834,008 to the same applicants.

Another scanning method according to the present invention is to provide premarking of the edges of a cut piece of fabric for easy edge detection of the piece during later processing of the piece. Such premarked pieces are particularly useful in edge following during sewing operations of the cut pieces onto other pieces, but can also be used in other applications where it is desired to provide edge enhancement.

Figures 4, 5:
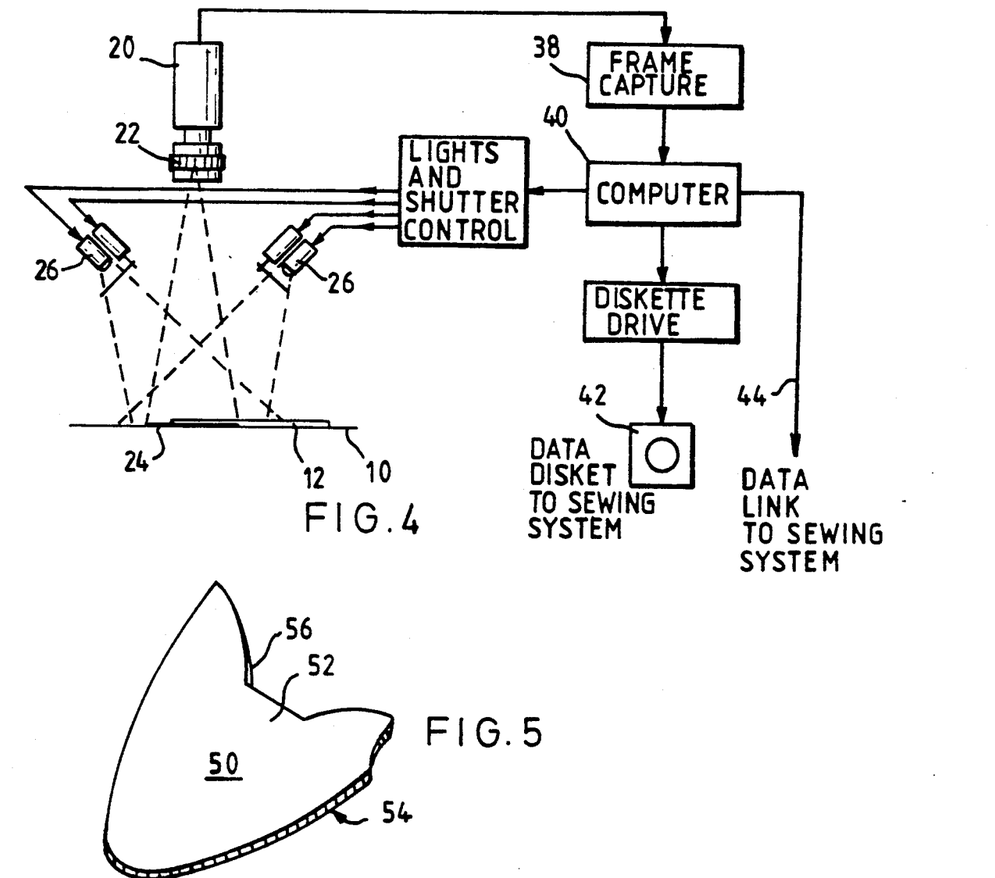
FIG. 4 is a block diagram illustrating the operative elements of the scanning apparatus of the present invention
FIG. 5 is a perspective view of a cut piece of material to be sewn constructed and operative in accordance with the present invention.

There is shown in FIG. 5 a cut piece 50 according to the present invention. Cut piece 50 may comprise leather, fabric, or any other material whose edges are to be enhanced. Cut piece 50 includes top and bottom planar surfaces 52 and 54 and a circumferential cut edge 56. It is the purpose of the present invention to mark the cut edge 56 with means contrasting with top surface 52 or with the surface onto which the cut piece is to be sewn, such as paint of a contrasting color or liquid visible only under ultraviolet light.

The marked cut edge 56 can be observed at any later stage of processing by means of a scanning camera, such as that shown in the above identified patents, aimed at the edge, with ultraviolet or other special illumination if required due to the nature of the marking material. In this case, the angle of illumination is relatively unimportant, as no edge shadow is required, merely illumination of the contrasting marking.

Figure 6:
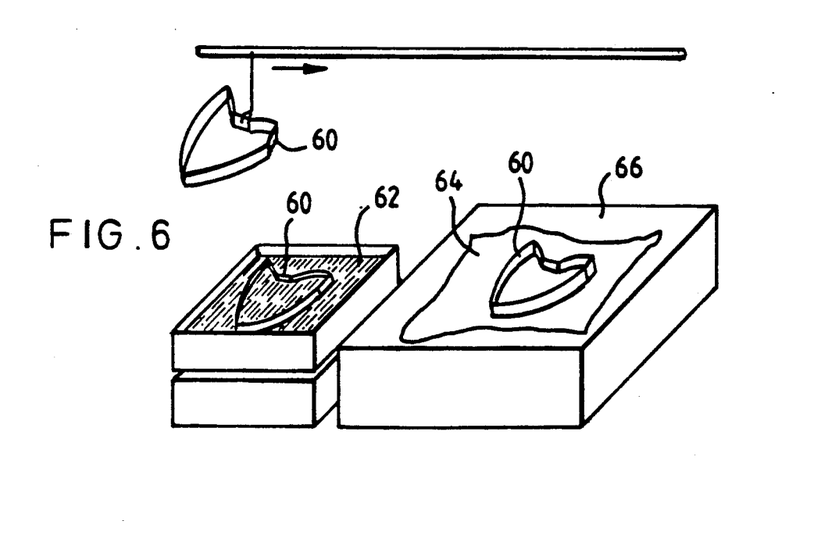
FIG. 6 is a schematic diagram of apparatus constructed and operative in accordance with one embodiment of the present invention.
Figure 7:
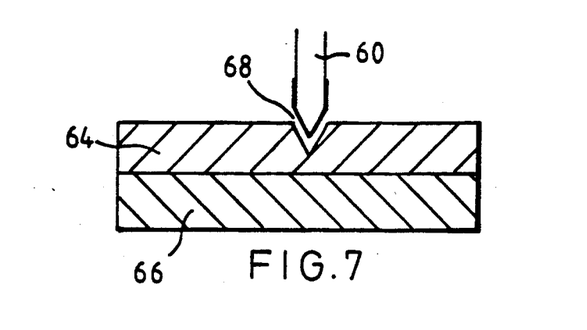
FIG. 7 is a detail illustration of a portion of FIG. 6.

According to one embodiment of the present invention, illustrated in FIGS. 6 and 7, the means for marking comprises the cutting die 60, itself. As shown in FIG. 2, cutting die 60 is lowered into a bath 62 of liquid marking material or any other material which will coat the blade edges of the die. The piece 64 to be cut is mounted on a workholder 66, as known. Coated die 60 is removed from bath 62 and lowered onto workholder 66. As die 60 cuts piece 64, the marking material on the blade edges is transferred to the cut edges 68 of the piece 64, as shown in detail in FIG. 7.

Figure 8:
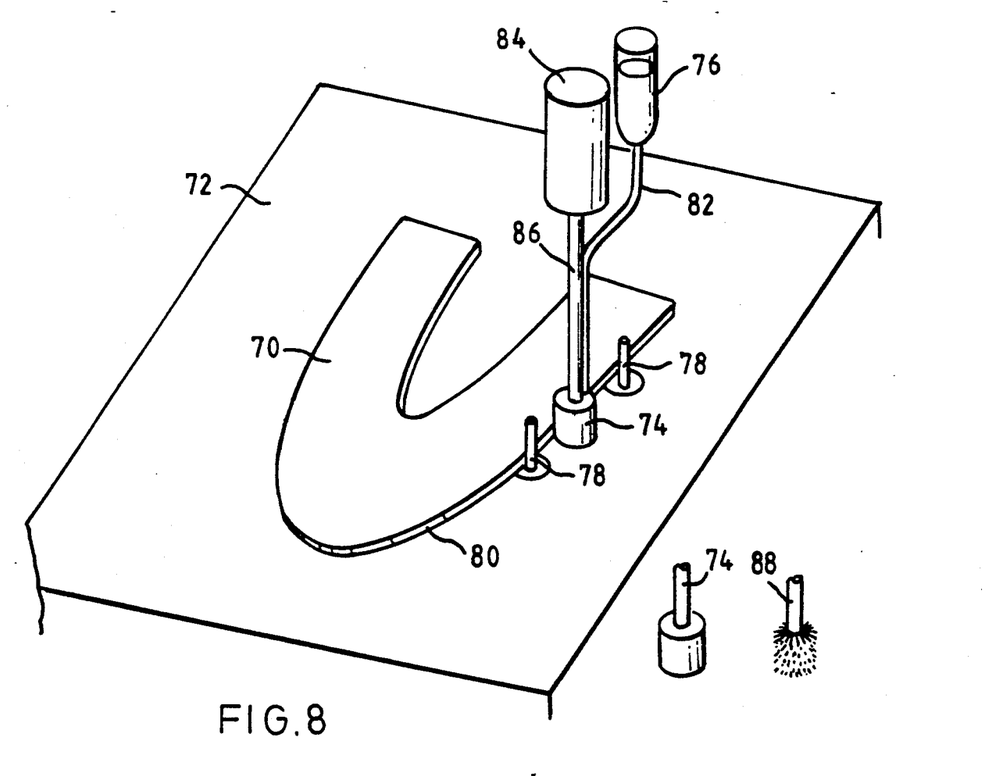
FIG. 8 is a schematic diagram of apparatus constructed and operative in accordance with an alternate embodiment of the present invention.

According to an alternate embodiment of the invention, shown schematically in FIG. 8, cutting of piece 70 is accomplished in any known manner. Cut piece 70 is placed on a table 72 and held thereon with its edge 80 against retaining means 78. A roller 74 or other suitable means, such as brush means, is mounted on a shaft 86 arranged for rotation by motor 84. A bath 76 applies marking material, such as color, to the roller 74, as by means of tube 82. As roller 74 spins, the cut piece 70 is rotated on table 72 in such a way that edge 80 is retained in contact with the surface of roller 74, whereby the cut edge of piece 70 is coated. Alternatively, any other conventional means of coating the cut edge of piece 70 may be utilized, including moving a brush or roller around the circumference of piece 70.

According to yet another embodiment of the invention, the cut edge, or even the entire piece, if desired, is sprayed or dusted with a fine white powder, preferably in a closed chamber. The powder creates a thin coating which does not affect the accuracy of the edge position, but which enables easy viewing of the edge against a contrasting dark color material. This embodiment is particularly useful when both the cut piece and the material to which it is to be sewn are dark in color, so little light is reflected thereby.

Figure 9:
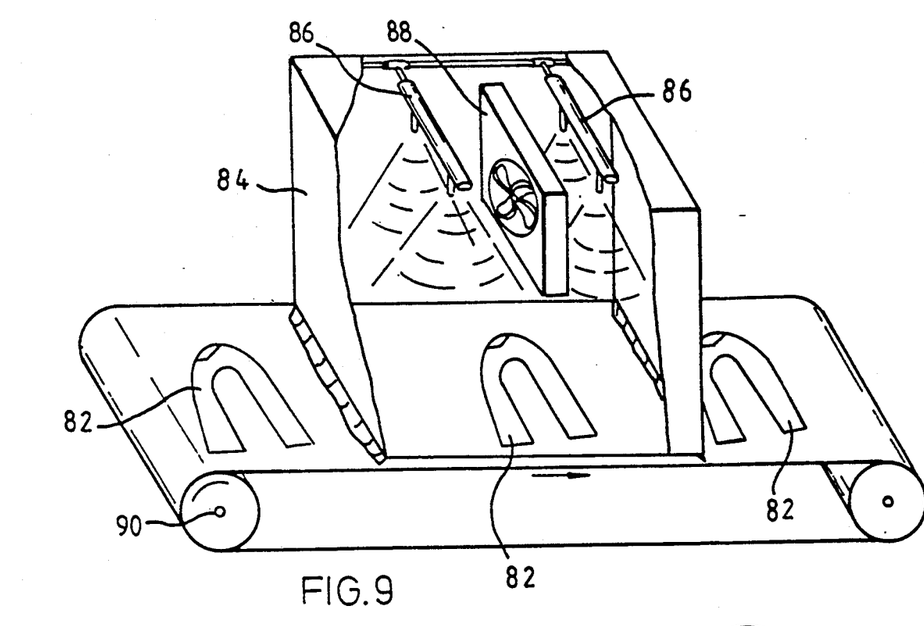
FIG. 9 is a schematic diagram of apparatus constructed and operative in accordance with another embodiment of the present invention.

An example of this embodiment is shown schematically in FIG. 9. Cut piece 82 is placed on a conveyor 90 and carried into chamber 84. Inside chamber 84, a colored powder is sprayed through nozzles 86. An air fan 88 further turbulates the powder until it evenly coats piece 82, which is then carried from the chamber on the conveyor 90.

The sewing operation with incorporated edge detection is accomplished using the coated pieces. Sufficient light is now reflected from the white coating and the edges are visible for regular edge detection.

Following the sewing operation, the powder is removed by air blowing or by brushing with soft brushes or any other known method. This can be done in a closed chamber 86 or in any other desired fashion.

It will be appreciated by those skilled in the art that coating of the cut edge of a cut piece for edge enhancement can be accomplished in any known fashion and utilizing any contrasting means which an either be permanent or removable after the processing process.

Figures 10, 10A:
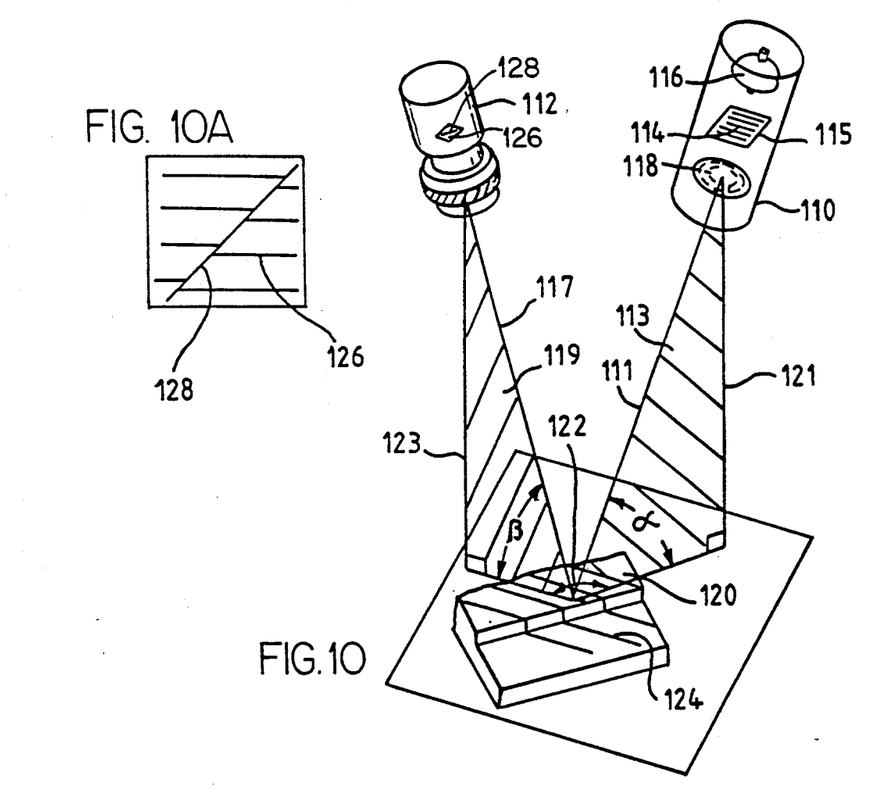
FIG. 10 is a schematic perspective view of apparatus for edge location analysis constructed and operative in accordance with the present invention
FIG. 10a is a depiction of an image scanned from a pattern projected by an illumination source.

With reference to FIG. 10 there is shown a schematic perspective view of apparatus for edge location analysis constructed and operative in accordance with the present invention comprising a pattern projecting source 110 and associated scanning camera 112. The edge location analysis apparatus of the present invention is particularly suited to computerized sewing apparatus and has been described herein with relation thereto. However, it will be appreciated that the invention is not limited to that application.

Pattern projecting source 110 comprises a pattern 114 defining any ordered pattern in which a discontinuity is readily observable, such as straight lines, or mesh. Preferably, source 110 projects a pattern of light onto the object. The most preferred pattern is a set of parallel lines of light projected normally to the line of inclination of the camera on the field of view.

In the embodiment of FIG. 10, pattern 114 is printed on a transparency 115 which is illuminated by illuminating means 116 and projected by a projecting lens 118 onto the object 120 whose edge location is to be analyzed. The optical axis 111 of projecting source 110 is inclined at an angle alpha relative to the horizontal plane of object 120. A projection inclination plane 113 is formed between axis 111 and the normal 121. In this embodiment, transparency 115 is opaque while pattern 114 permits the passage of light, thereby generating a pattern of light on the object.

Scanning camera 112, which may comprise any suitable scanner, such as an area C.C.D. camera, has an optical axis 117 disposed at an angle beta relative to the plane of object 120. A projection inclination plane 119 is formed between axis 117 and the normal 123. An angle gamma (122) on the object plane is defined between the two inclination planes 113 and 119. Most preferably angle gamma is 90 degrees, as this provides the greatest magnitude of discontinuity. However, any angle other than 180 degrees (i.e., the same plane) can alternatively be used.

Operation of the device of FIG. 10 is as follows. Illumination source 116 illuminates transparency 115 and projects a light image 124 of pattern 114 onto the edge of object 120. Scanner 112 scans image 124 and provides data corresponding to the scanned image 126 to a microprocessor (not shown) which analyzes the data to determine the location of the discontinuity 128 and, thus, of the edge.

Figures 11, 11A:
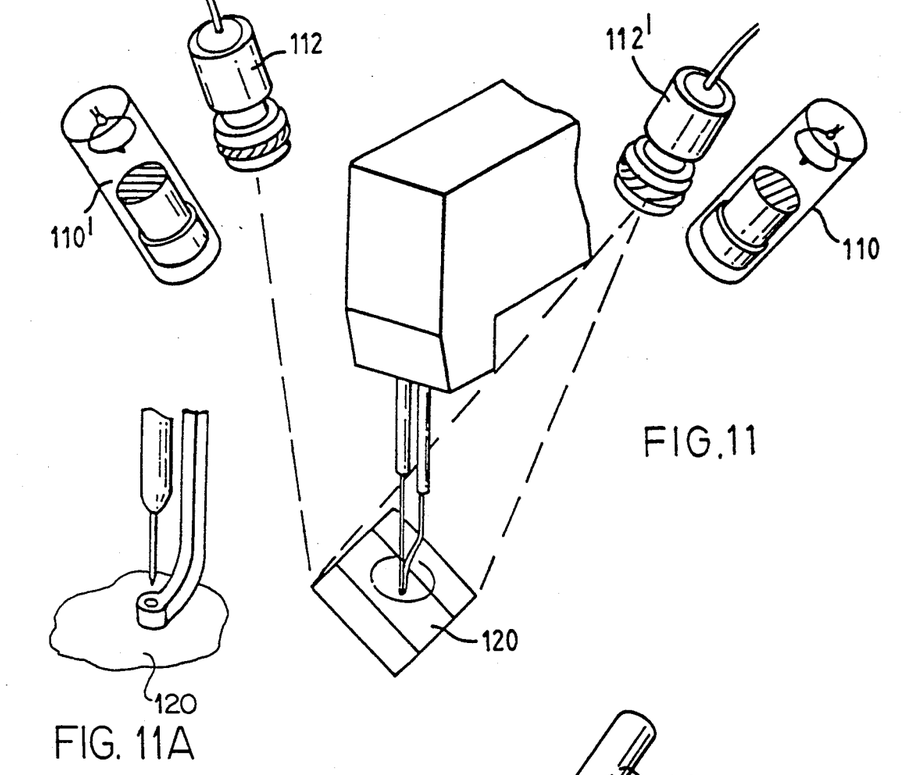
FIG. 11 and FIG. 11a are illustrations of a preferred embodiment of the invention utilizing the apparatus of FIG. 10.

With reference to FIG. 11, there is shown a computerized sewing machine including edge detection apparatus constructed and operative in accordance with the present invention. The apparatus includes a plurality of sets of cameras and pattern projection sources arranged so as to project a pattern of light onto the sewn piece in a diagonal relationship between the pattern projection source axis and the respective camera optical axis (as shown in FIG. 10), where each set covers a section of the area around the sewing needle location.

In the embodiment of FIG. 11, the edge detection apparatus comprises a pair of pattern projecting sources 110 and 110' and scanning cameras 112 and 112', as shown in FIG. 10, disposed around the sewing head. Pattern projecting source 110 is disposed at an angle to scanner 112 and pattern projecting source 110' at an angle to scanner 112', as discussed above. Each set of projecting source and scanner covers a different section of the object 120, although the sections may overlap.

According to this embodiment, a microprocessor (not shown) is coupled to each of the projecting sources and scanners and is operative to actuate one set at a time, in accordance with the direction of sewing and the location of the object's edge, so that the edge segment of interest fully lies in the field of view of the selected camera. Each of the scanning cameras is arranged to translate its scanned image into data to be provided to the microprocessor. The microprocessor analyzes this scanned image data to determine the edge location.

It will be appreciated that the direction of sewing and the location of the object's edge at any given time is known in advance from the pre-programmed sewing path. Since, in each frame, the approximate orientation of the edge is known, the desired projection source and camera can be actuated to observe the greatest discontinuity. While, any angle other than 180° (the pattern parallel to the scanned edge) can be utilized, the ideal situation is when the pattern is perpendicular to the scanned edge. A suitable synchronization program will permit the microprocessor to partition the object into scannable segments and to determine which camera will scan which segment.

According to one embodiment, the microprocessor also includes the pre-programmed sewing instructions and is arranged to direct the movement of the object on its holder during the sewing process. It further utilizes the data received from the scanners to adjust the sewing path, in real time, in accordance with the actual location of the edge of the object.

According to an alternate embodiment, the edge analysis may be performed on the object on its workholder prior to the actual sewing process. The data received from the scanners can be stored in the microprocessor and later used to modify the sewing path, as required.

Figure 12:
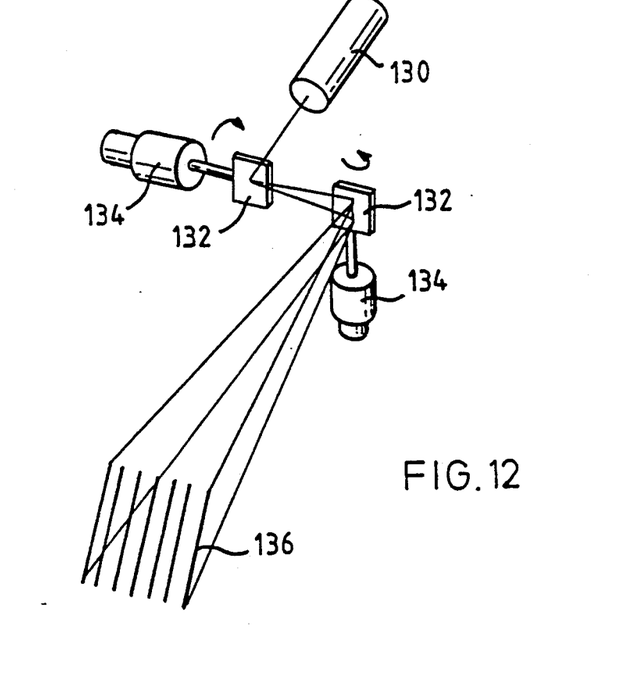
FIG. 12 is a schematic view of an alternate pattern projection source operative in the present invention.

Referring now to FIG. 12, there is shown an alternate pattern projection source operative in the present invention and comprising a laser pattern generator. The laser pattern generator comprises a laser source 130 and two rotating mirrors 132 coupled for rotation to motors 134. The rotating mirrors 132 plot the pattern 136 by shifting the laser beam in the field of view of the camera. Such a device is commercially available from Laser Scanning Products, U.S.A.

It will further be appreciated by those skilled in the art that the invention is not limited to what has been shown and described hereinabove by way of example. Rather, the scope of the invention is limited solely by the claims which follow.

We claim:

1. Apparatus for preliminary scanning of an object to be sewn on a computerized sewing apparatus comprising:

a workholder arranged to hold the object and means for moving the object from said scanning apparatus to a separate sewing apparatus;

a microprocessor;

means for scanning segments of said object on the workholder prior to sewing and arranged to provide an output signal corresponding to the scanned image data to the microprocessor;

means for causing relative movement between the workholder and said scanning means in accordance with a predetermined sewing path during scanning, said means for causing movement being controlled by said microprocessor;

means for determining the true edge locations of the object from said output signal;

comparator means to compare the true edge locations with pre-programmed expected edge locations and to determine any deviation; and means for determining any necessary modification of the sewing path to compensate for any such deviation.

2. Apparatus according to claim 1 and wherein:

said comparator means and means for determining modification are coupled to said microprocessor; and further comprising means coupled to the microprocessor for recording any such modification data for transfer to said computerized sewing apparatus.

3. Apparatus according to claim 1 and further comprising means coupled to the microprocessor for recording said edge location data for transfer to said computerized sewing apparatus;

and wherein said comparator means and means for determining modification are coupled to said computerized sewing apparatus.

4. Apparatus according to claim 1 wherein said means for scanning segments of said object comprise:

a scanning camera disposed above said object; and at least two illuminating lamps coupled to said camera and disposed for diagonal illumination of the edge of said object being scanned, said lamps being activated by said microprocessor.

5. Apparatus according to claim 4 wherein said illuminating lamps comprise optical fibers coupled to a light source, each having at its end a shutter element for selectably permitting or preventing passage of light.

6. Apparatus for edge location analysis according to claim 1 and further comprising:

means for projecting light onto an object whose edge is to be detected;

scanner means, whose optical axis is disposed in a diagonal relationship with the light projection source axis, arranged to provide an output signal corresponding to the scanned object; and microprocessor means for analyzing the location of the edge of the object in accordance with said output signal.

7. A method for edge location analysis for use in a computerized sewing system comprising:

scanning edges of an object to be sewn in a preliminary scanning cycle to generate images thereof, said scanning cycle comprising the steps of:

causing relative motion of the object relative to a scanning assembly in accordance with a predetermined sewing path; and scanning sequential segments of the object and generating image data corresponding to each scanned frame;

generating true edge location data from the scanned images in an image analysis step, said image analysis step comprising the steps of:

determining the true edge locations of the object from said image data; and determining necessary modifications of the predetermined sewing path in light of the true edge location data;

sewing adjacent the object edge utilizing the predetermined path as modified in accordance with the true edge location data on a sewing machine separate from said scanning assembly; and transferring the object to be sewn from said scanning assembly to said sewing machine before said step of sewing.

* * * * *